United States Patent
Yang

(10) Patent No.: US 7,330,398 B2
(45) Date of Patent: Feb. 12, 2008

(54) ULTRASONIC RANGE FINDER

(75) Inventor: Dezhong Yang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 11/428,920

(22) Filed: Jul. 6, 2006

(65) Prior Publication Data

US 2007/0008820 A1    Jan. 11, 2007

(30) Foreign Application Priority Data

Jul. 8, 2005    (CN)    ............... 2005 2 0073449 U

(51) Int. Cl.
G01S 15/00 (2006.01)

(52) U.S. Cl. ......................... 367/99; 367/902

(58) Field of Classification Search ............... 367/902, 367/99
See application file for complete search history.

(56) References Cited

U.S. PATENT DOCUMENTS

| | | | |
|---|---|---|---|
| 3,454,922 A | | 7/1969 | Dory |
| 4,173,725 A | * | 11/1979 | Asai et al. ............... 310/325 |
| 4,210,969 A | * | 7/1980 | Massa ..................... 367/902 |
| 4,254,478 A | | 3/1981 | Dumas |
| 4,358,835 A | | 11/1982 | Fage |
| 4,500,977 A | * | 2/1985 | Gelhard ................... 367/909 |
| 4,581,726 A | | 4/1986 | Makino et al. |
| 4,584,676 A | * | 4/1986 | Newman .................. 367/902 |
| 4,654,834 A | * | 3/1987 | Dorr ........................ 367/909 |
| 4,679,175 A | * | 7/1987 | Eder et al. ............... 367/902 |
| 4,719,605 A | * | 1/1988 | Eder et al. ............... 367/902 |
| 4,769,793 A | * | 9/1988 | Kniest et al. ............ 367/902 |
| 4,803,670 A | * | 2/1989 | Chen ........................ 367/99 |
| 4,910,717 A | * | 3/1990 | Terry ........................ 367/99 |
| 4,980,869 A | * | 12/1990 | Forster et al. ............ 367/99 |
| 5,140,859 A | | 8/1992 | Shah |
| 5,442,592 A | | 8/1995 | Toda et al. |
| 5,815,251 A | | 9/1998 | Ehbets et al. |
| 6,157,591 A | * | 12/2000 | Krantz ...................... 367/99 |
| 6,469,956 B1 | * | 10/2002 | Zeng ......................... 367/99 |
| 2004/0060376 A1 | * | 4/2004 | Munro ...................... 367/99 |
| 2005/0007878 A1 | * | 1/2005 | Chen ......................... 367/99 |
| 2005/0111301 A1 | * | 5/2005 | Rickman .................. 367/99 |
| 2007/0008820 A1 | * | 1/2007 | Yang ......................... 367/99 |

FOREIGN PATENT DOCUMENTS

| | | |
|---|---|---|
| CN | ZL02248586.4 | 10/2002 |
| EP | 0401692 | 12/1990 |
| WO | WO 93/07510 | 4/1993 |

* cited by examiner

Primary Examiner—Dan Pihulic
(74) Attorney, Agent, or Firm—McDermott Will & Emery LLP

(57) ABSTRACT

The present invention is intended to provide an ultrasonic range finder to measure a distance quickly and precisely under different environments. The ultrasonic range finder comprises a casing, an ultrasonic transmitting/receiving unit, a signal processing circuit connected electrically with the ultrasonic transmitting/receiving unit in the casing, a group of operation buttons on the casing and a display unit. The ultrasonic range finder further comprises a calibration rod to provide a constant reference distance. The calibration rod includes a first end connected to the casing. The calibration rod further includes a second end extendable outwardly relative to the casing and a body between the first and the second ends. By measuring a propagation time of an ultrasonic signal within the constant reference distance an ultrasonic propagation speed can be determined quickly and precisely and thereby perform the distance measurement quickly and precisely without being affected by changes in the environment.

15 Claims, 5 Drawing Sheets

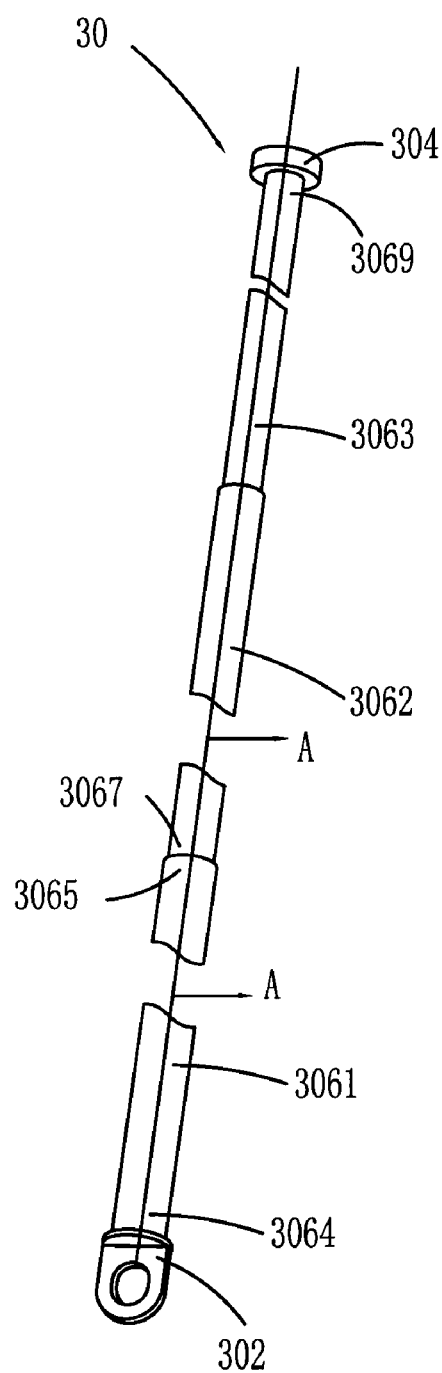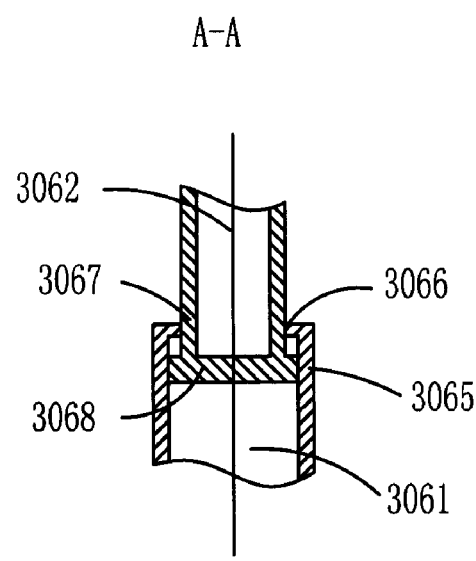
FIG 3
FIG 4

ULTRASONIC RANGE FINDER

CROSS-REFERENCE TO RELATED APPLICATIONS

This application claims priority to Chinese Application No. 200520073449.7, filed on Jul. 8, 2005, the entire disclosure of which is incorporated herein by reference. Priority to this application is claimed under 35 U.S.C. 119, 120 and/or 365.

FEDERALLY SPONSORED RESEARCH OR DEVELOPMENT

None.

TECHNICAL FIELD

The invention relates to a range finder, and more particularly, to an ultrasonic range finder that determines a measured distance through detecting an ultrasonic propagation time within the measured distance.

BACKGROUND OF THE INVENTION

Currently, ultrasonic range finders are widely used in many fields such as in engineering. Usually, the ultrasonic range finders detect an ultrasonic propagation time within a measured distance, and then the measured distance can be obtained by multiplying the ultrasonic propagation time by an ultrasonic propagation speed. But the ultrasonic propagation speed is not a constant value and often varies with respect to changes in the environment. Environmental factors affecting the ultrasonic propagation speed include the temperature, humidity, atmospheric air pressure and other atmosphere components. However, the temperature and the humidity are the leading factors.

China patent No. ZL 02248586.4 discloses an ultrasonic range finder with a temperature compensation circuit in which a temperature-sensitive resistor of the temperature compensation circuit senses the environment temperature so that the ultrasonic propagation speed can be compensated. However, it does not compensate for other environment factors and so the measuring precision can not be ensured. U.S. Pat. No. 4,581,726 discloses an ultrasonic range finder with a sensor detecting multiple atmospheric characteristics. However, such a sensor is very expensive causing the manufacturing cost of the range finder to also be very expensive.

Additionally, when the above-mentioned range finder is moved from one environment to another environment, the above-mentioned sensor will measure the atmospheric characteristics precisely only after a long time (maybe several minutes depending on the conditions) causing the results in the measuring time to be lengthened. It is obvious that this limits the use of the disclosed ultrasonic range finder.

The present invention is provided to solve these and other problems.

SUMMARY OF THE INVENTION

An object of the present invention is to provide an ultrasonic range finder to measure a distance quickly and precisely in different environments. The ultrasonic range finder detects an ultrasonic propagation time produced by the range finder within a constant reference distance to determine an ultrasonic propagation speed in the current environment. In this way, the determination of the ultrasonic propagation speed is not affected by atmospheric characteristics, and the ultrasonic propagation speed may be determined quickly and precisely in any environment so as to perform the distance measurement quickly and precisely.

Another object of the present invention is to provide an ultrasonic range finder, which can produce a visible mark on a target surface at a distance to be measured so that the user can align the ultrasonic beam with the target surface.

A further object of the present invention is to provide an ultrasonic range finder with a measuring object target so that the distance measurement can still be operated when there is no natural target surface at the distance to be measured.

To achieve the above-mentioned objects, in a preferred embodiment according to the present invention, an ultrasonic range finder comprises a casing, an ultrasonic transmitting/receiving unit, a signal processing circuit electrically connected with the ultrasonic transmitting/receiving unit and located in the casing, a group of operation buttons on the casing and a display unit. The ultrasonic range finder further comprises a calibration rod having a first end connected to the casing. The calibration rod further has a second end that can extend outwardly relative to the casing, and a body between the first and the second ends. One of the calibration rods and the casing has at least a stopping member for limiting the body of the calibration rod within a specified length. The body of the calibration rod is telescopic or foldable.

The ultrasonic range finder further comprises a laser-emitting unit that can produce a visible mark on the target surface at the distance to be measured.

The ultrasonic range finder further comprises an object target comprising a casing. The casing of the object target further comprises a positioning groove corresponding to the second end of the calibration rod. The object target further comprises an ultrasonic transmitting/receiving unit and a control circuit electrically connected therewith, both of which are mounted in the casing, and an indicating light electrically connected with the control circuit and located on the casing.

Other features and advantages of the invention will be apparent from the following specification taken in conjunction with the following drawings.

BRIEF DESCRIPTION OF THE DRAWINGS

The various embodiments according to the present invention will be further described in detail combined with the figures hereinafter.

FIG. 3 is a perspective view of the calibration rod of the ultrasonic range finder shown in FIG. 2;

FIG. 4 is a perspective view along line A-A as shown in FIG. 3 of a connecting portion of the first tube and the second tube of the calibration rod;

DETAILED DESCRIPTION

Figure 1:
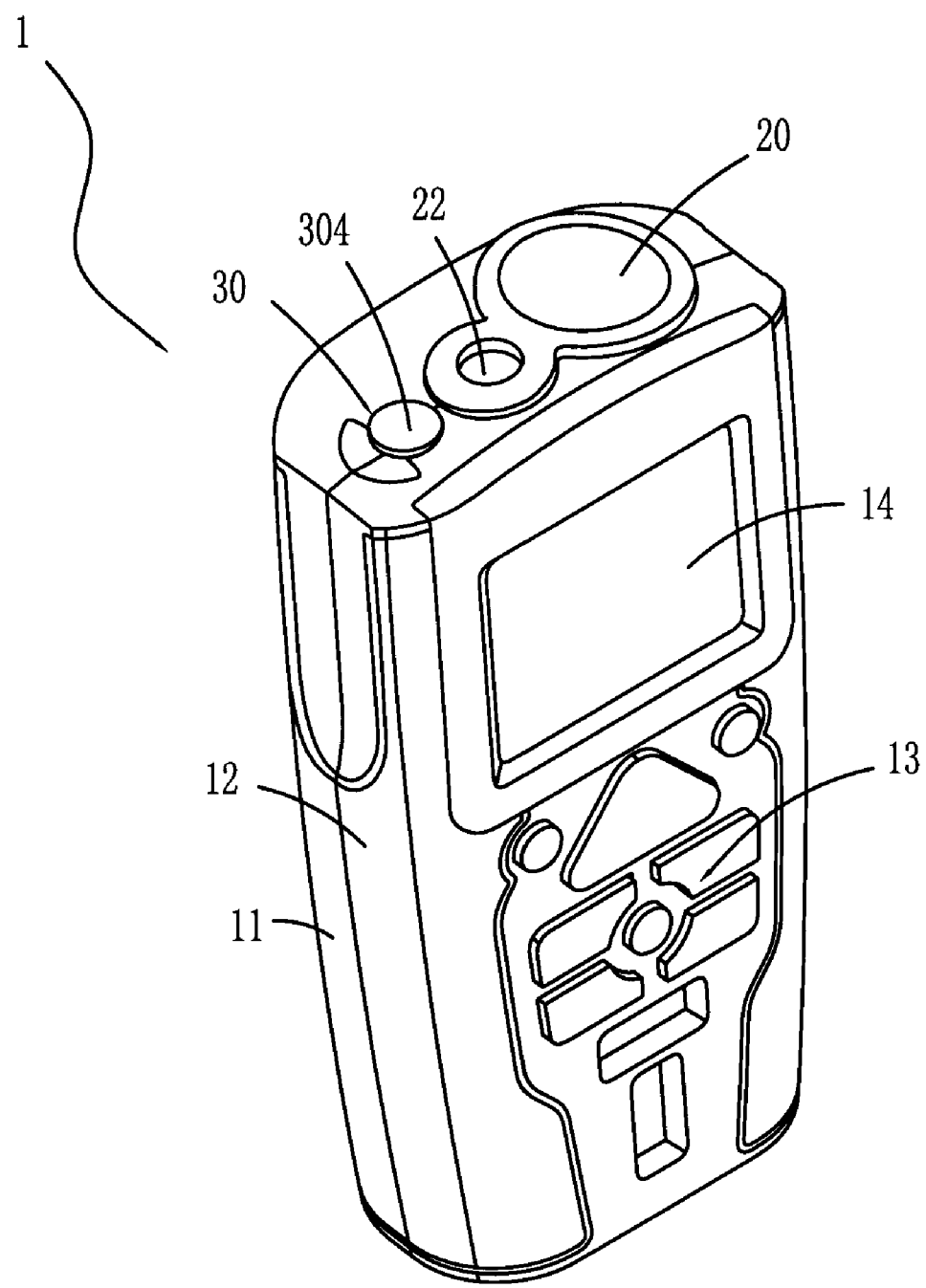
FIG. 1 is a perspective view of an ultrasonic range finder of a preferred embodiment according to the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
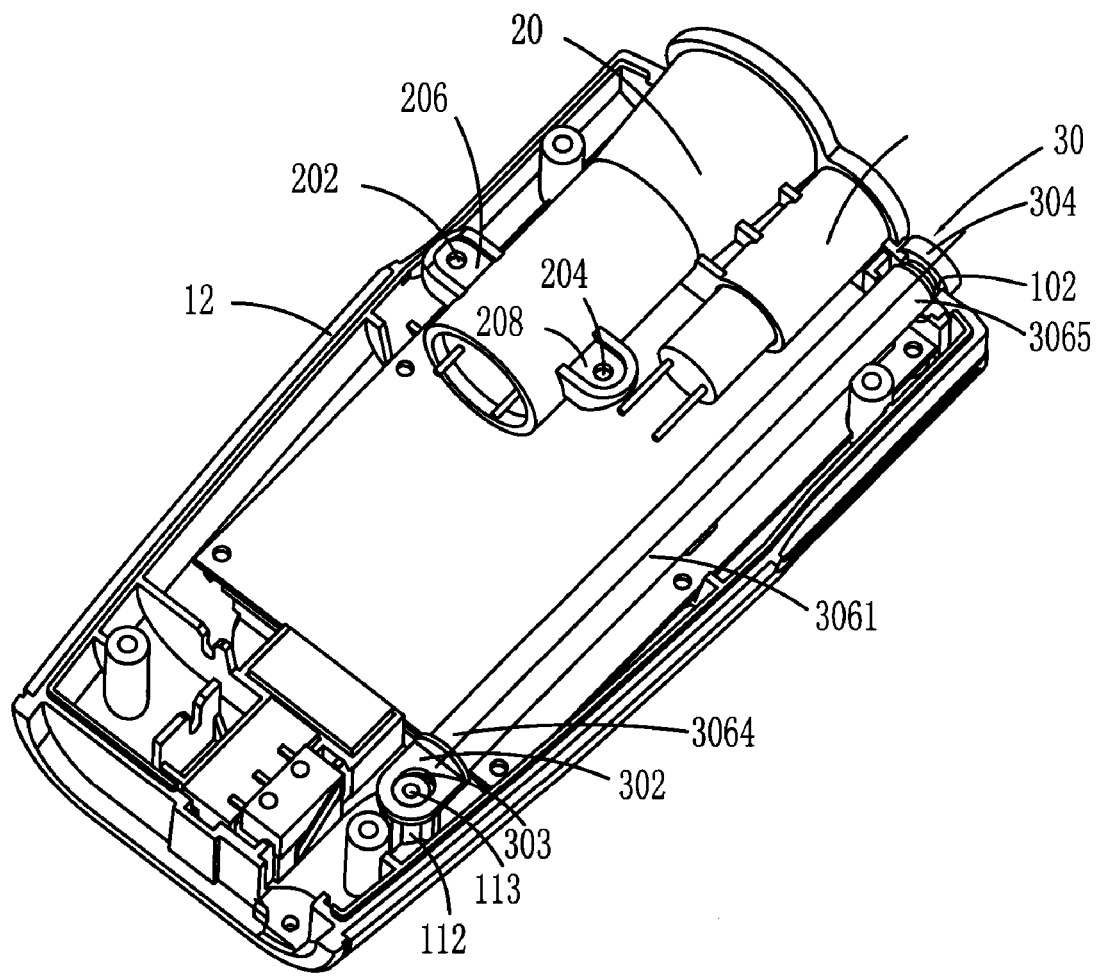
FIG. 2 is a perspective view of the ultrasonic range finder of FIG. 1 with a right casing removed away to show an inner configuration.

As shown in FIG. 1 to FIG. 2, a preferred embodiment of the present invention provides an ultrasonic range finder 1, which includes a casing comprising a right casing 11 and a left casing 12, an ultrasonic transmitting/receiving unit 20, a signal processing circuit (not shown in Figs), a group of operation buttons 13, a display unit 14 for displaying the result of a distance measurement, and a calibration rod 30. With reference to FIG. 2, a flange 206 and a flange 208 are protruded respectively from two sides of one end of the ultrasonic transmitting/receiving unit 20. Holes 202 and 204 are provided on the flanges 206 and 208, respectively. Two bolts (not shown) penetrate the holes 202 and 204 to fix the ultrasonic transmitting/receiving unit 20 within the casing, respectively. The signal processing circuit is mounted in the casing and is electrically connected to the ultrasonic transmitting/receiving unit 20. When the ultrasonic transmitting/receiving unit 20 transmits an ultrasonic signal forward, the signal processing circuit begins a counting, and when the ultrasonic transmitting/receiving unit 20 receives the ultrasonic signal reflected back from a target surface at a distance to be measured, the signal processing circuit finishes the counting. The time measured by the signal processing circuit is a round trip propagation time of the ultrasonic signal within the measured distance. Thereby the measured distance is calculated as long as an ultrasonic propagation speed is known. The group of operation buttons 13 includes at least one calibration button.

Referring now to FIGS. 2 and 3, the calibration rod 30 includes a first end 302, a second end 304, and a body between the first and the second ends. In the preferred embodiment, the first end 302 is provided with a hole 303. An inner side of the right casing 11 is provided with a step-shaped protrusion 112 with a bolt hole 113. An upper portion of the step-shaped protrusion 112 with a smaller radius passes partially through the hole 303. By mating a bolt (not shown) with the bolt hole 113 of the protrusion 112, the first end 302 of the calibration rod 30 is press-fitted onto the protrusion 112 tightly.

As shown in FIG. 3 and FIG. 4, the body of the calibration rod 30 is formed by connecting three tubes 3061, 3062, and 3063 one by one. An inner diameter of the first tube 3061 is larger than an outer diameter of the second tube 3062. One end 3064 of the first tube 3061 is connected fixedly with the first end 302 of the calibration rod 30, and the other end 3065 thereof is fixed into a hole 102 at the front end of the casing. And the other end 3065 of the first tube 3061 still has a hole 3066 whose inner diameter is equal to the outer diameter of the second tube 3062. The second tube 3062 passes through the hole 3066 at the end 3065 of the first tube 3061, and an end 3067 of the second tube 3062 which is located in the first tube 3061 has a short cylinder 3068 whose outer diameter is equal to the inner diameter of the first tube 3061 so that the end 3067 of the second tube can always be maintained within the first tube 3061. With the hole 3066 at the end 3065 of the first tube 3061 which serves as a stop member for the short cylinder 3068 of the second tube 3062, the second tube 3062 is limited within the largest extending length when pulled out of the first tube 3061. Similarly, the third tube 3063 is connected with the second tube 3062. An end 3069 of the third tube 3063 exposed out of the second tube 3062 is connected fixedly with the second end 304 of the calibration rod 30.

Figure 5:
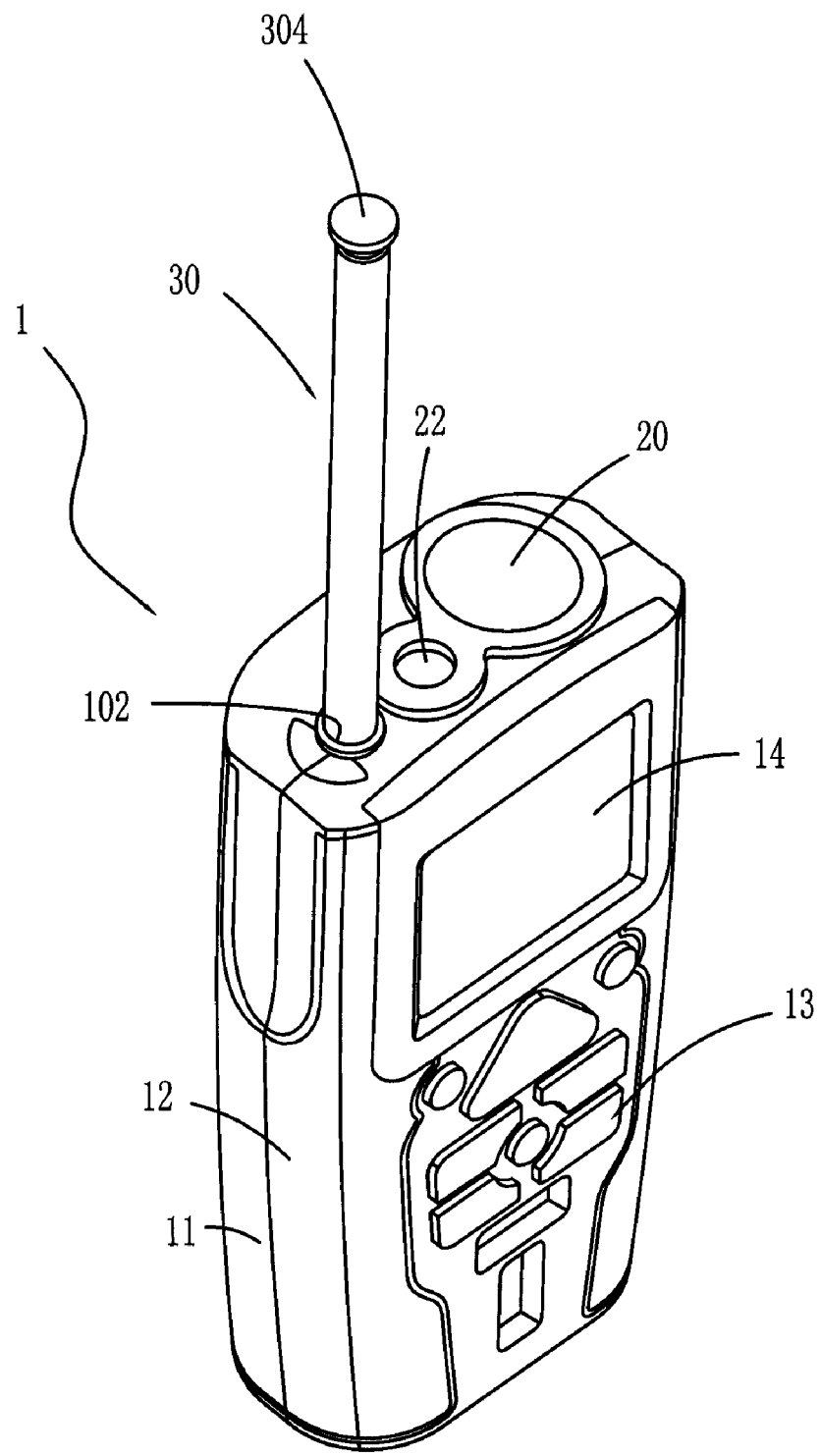
FIG. 5 is a perspective view of the ultrasonic range finder as shown in FIG. 2 with the calibration rod being pulled out partially.

FIG. 5 shows the state when the calibration rod 30 of the ultrasonic range finder 1 is pulled out of the casing. During operation the user pulls all the tubes to the largest extending length by pulling the second end 304 of the calibration rod 30 and abuts the second end 304 of the calibration rod 30 against a flat surface to determine a constant reference distance, and then presses down the calibration button, so that a round trip propagation time of an ultrasonic signal within the constant reference distance is obtained by the ultrasonic range finder. Thereby the accurate propagation speed of the ultrasonic signal is calculated in the current existing environment.

It should be appreciated to a person skilled in the art that the calibration rod may also have other structures. In other embodiments, the calibration rod may be a tapeline having a fixed length and is flexible relative to the casing. In this case, the end of the tapeline connecting with the casing is a stop member limiting the calibration rod within a fixed length. Certainly, the calibration rod may also be a common tapeline mounted in the casing, and the casing or the tapeline is provided with a lock member for locking the tapeline within a predetermined extending length, then the lock member is a stopping member for the calibration rod. The body of the calibration rod still can be other telescopic or folded structures.

In this preferred embodiment according to the present invention, the ultrasonic range finder 1 further comprises a laser emitting unit 22, as shown in FIG. 1. The laser emitting unit 22 is fixed in the casing and can emit a visible laser beam parallel to an ultrasonic emitting direction toward the outside of the casing and thereby to form a visible mark on a target surface at a distance to be measured.

Figure 6:
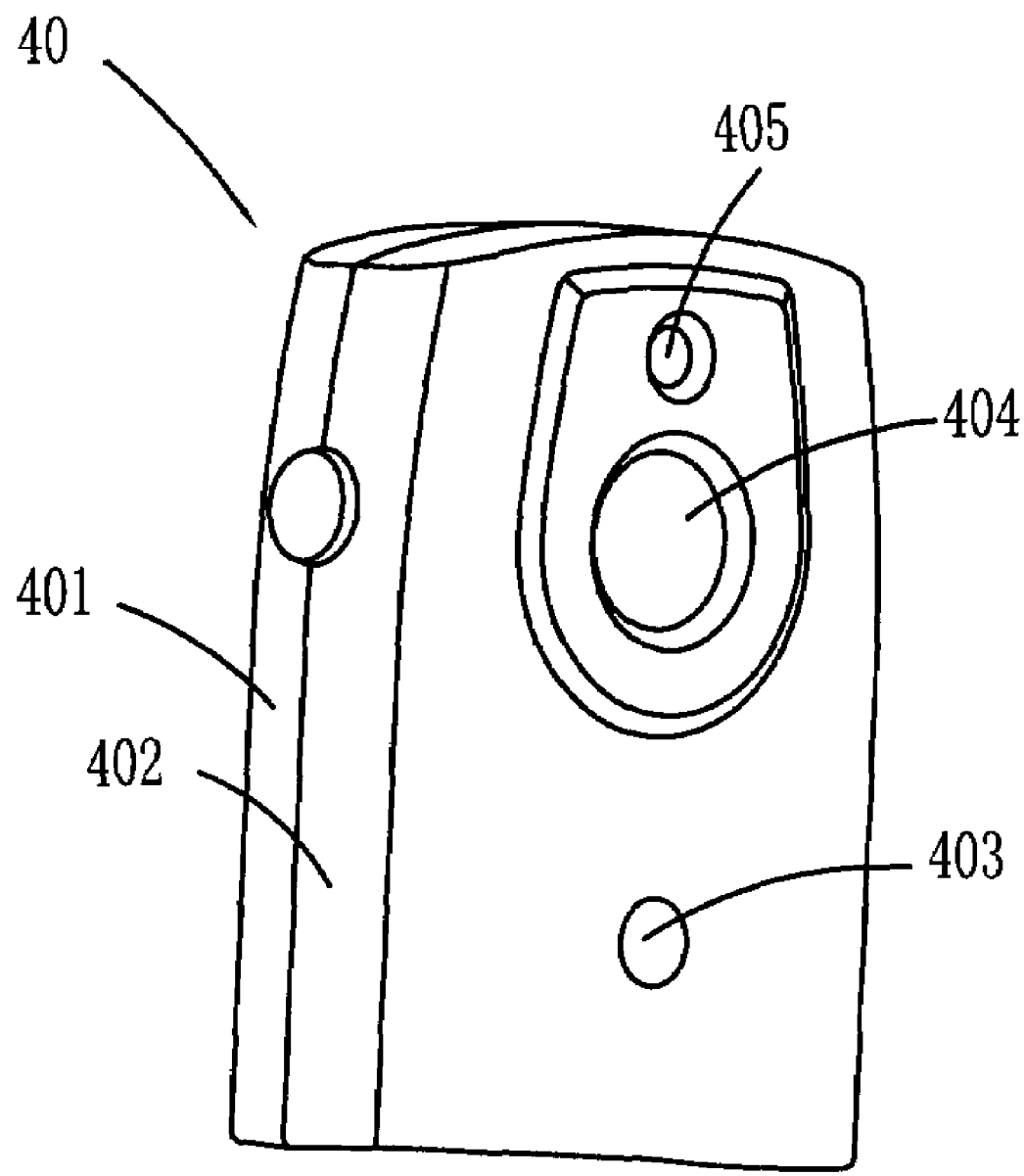
FIG. 6 is a perspective view of an object target of the ultrasonic range finder of the preferred embodiment.

As shown in FIG. 6, in this preferred embodiment according to the present invention, the ultrasonic range finder 1 may further include an object target 40. The object target 40 includes a casing comprising a front casing 402 and a back casing 401. On the surface of the front casing 402 is provided with a positioning groove 403 that matches in shape with that of the second end 304 of the calibration rod 30. The user can abut the second end 304 of the calibration rod 30 directly against the positioning groove 403 of the front casing 402 of the object target 40 for calibration without requirement of another flat surface for calibration.

Preferably, the object target 40 further includes an ultrasonic transmitting/receiving unit 404, a control circuit (not shown), and one or more LED indicating lights 405 mounted on the front casing 402. The ultrasonic transmitting/receiving unit 404 and the indicating lights 405 are connected electrically to the control circuit. If the ultrasonic transmitting/receiving unit 404 of the object target 40 receives an ultrasonic signal from the ultrasonic transmitting/receiving unit 20, the control circuit of the object target will output a corresponding electrical signal to control the indicating lights 405 to flash, and to control the ultrasonic transmitting/receiving unit 404 to send the ultrasonic signal as a feedback signal toward the ultrasonic transmitting/receiving unit 20. In this way, when there is no flat surface as a target surface at a distance to be measured or the distance to be measured is too far, the ultrasonic range finder 1 will also perform the distance measurement if the ultrasonic transmitting/receiving unit 20 and the signal processing circuit connected thereof serve as a host measurer, and the ultrasonic transmitting/receiving unit 404 of the object target 40 and the control circuit of the object target 40 serve as a slave measurer.

Such an ultrasonic range finder 1 has two range finding modes, one of which is a reflected type range finding mode without an object target, and the other of which is a feedback type range finding mode with an object target. Preferably, the group of buttons 13 further includes a mode switching button for selectively switching the two range finding modes.

The above descriptions and drawings of the preferred embodiment are only intended to describe and illustrate the principle of the present invention, but not to limit the scope of the present invention. It should be easily understood for those skilled in the art that other modifications and substitutions may be made to the ultrasonic range finder in the present invention without departing from the spirit and the scope of the present invention.

While the specific embodiments have been illustrated and described, numerous modifications come to mind without significantly departing from the spirit of the invention, and the scope of protection is only limited by the scope of the accompanying Claims.

What is claimed is:

1. An ultrasonic range finder comprising:
    a housing;
    an ultrasonic transmitting and receiving unit positioned within the housing;
    a signal processing circuit, which is mounted in the housing and is connected with the ultrasonic transmitting and receiving unit;
    a group of operation buttons on the housing which includes at least a calibration button;
    a display unit, for displaying the result of a distance measurement; and,
    a calibration member which has a first end connected to the housing, wherein the calibration member is comprised of a plurality of telescoping members, which when fully extended, extend outwardly from the housing.

2. An ultrasonic range finder comprising:
    a housing having an ultrasonic transmitting and receiving unit electrically connected to a signal processing unit, the ultrasonic transmitting and receiving unit capable of transmitting and receiving an ultrasonic beam;
    a calibration member having:
    a first end mounted in the housing;
    a second end, wherein the second end is extendable in a direction that an ultrasonic transmitting and receiving unit transmits an ultrasonic relative to the housing; and,
    a body between the first end and the second end.

3. An ultrasonic range finder according to claim 2, wherein the first end of the calibration member comprises an opening that is configured to fit over a step-shaped protrusion with a bolt hole in the housing.

4. An ultrasonic range finder according to claim 3, wherein an upper portion of the step-shaped protrusion has a smaller radius and passes partially through the opening in the calibration member and a bolt mates with the bolt hole of the step-shaped protrusion causing the first end of the calibration member to firmly press onto the step-shaped protrusion.

5. An ultrasonic range finder according to claim 2, wherein the body is formed by connecting three members one by one.

6. An ultrasonic range finder according to claim 5, wherein a second tube is connected with a first tube and an end of the second tube is exposed out of the first tube which is connected fixedly with the first end of the calibration member.

7. An ultrasonic range finder according to claim 6, wherein a third tube is connected with the second tube and an end of the third tube is exposed out of the second tube which is connected fixedly with the second end of the calibration member.

8. An ultrasonic range finder according to claim 2, wherein one of the calibration member and the housing has at least one stop member to limit the body of the calibration member within a fixed length.

9. An ultrasonic range finder rod according to claim 2, wherein the body of the calibration member is extendable.

10. An ultrasonic range finder according to claim 2, further comprising a laser emitting unit, which is mounted within the housing and can produce a visible mark on a target surface at a distance to be measured.

11. An ultrasonic range finder comprising:
    a housing;
    an ultrasonic transmitting and receiving unit mounted within the housing;
    a control circuit connected to the ultrasonic transmitting and receiving unit;
    an extendable calibration member;
    an object target comprising a housing, an ultrasonic transmitting and receiving unit mounted in the object target housing and electrically connected to an object target control circuit, and an indicator electrically connected to the object target control circuit.

12. An ultrasonic range finder according to claim 11, wherein the object target housing has a positioning groove matching one end of the extendable calibration member.

13. An ultrasonic range finder according to claim 11, wherein the indicator is an LED indicating light.

14. An ultrasonic range finder according to claim 11, wherein the ultrasonic range finder has a reflected-type range finding mode that operates without the object target and a feedback-type range finding mode that operates with the object target.

15. An ultrasonic range finder according to claim 14, further comprising an operation button for selectively switching between the reflected-type range finding mode and the feedback-type range finding mode.

* * * * *